United States Patent [19]
Borik

[11] Patent Number: 4,581,079
[45] Date of Patent: Apr. 8, 1986

[54] BEARING STEEL

[75] Inventor: Frank Borik, Whitmore Lake, Mich.

[73] Assignee: AMAX Inc., Greenwich, Conn.

[21] Appl. No.: 716,311

[22] Filed: Mar. 27, 1985

[51] Int. Cl.$^4$ .......................... C21D 7/14; C21D 9/40
[52] U.S. Cl. ................ 148/12 R; 148/12 F; 148/36
[58] Field of Search ............... 148/12 R, 12 B, 12 F, 148/12.3, 36, 134; 75/126 C

[56]         References Cited
         U.S. PATENT DOCUMENTS

| | | | |
|---|---|---|---|
| 2,844,500 | 7/1958 | Peras | 148/36 |
| 3,155,550 | 11/1964 | Mitchell et al. | 148/134 |
| 3,194,698 | 7/1965 | Mitchell | 148/134 |
| 3,306,734 | 2/1967 | Aksoy et al. | 148/36 |
| 3,595,711 | 7/1971 | Faunce et al. | 148/36 |
| 3,663,314 | 5/1972 | Monma et al. | 75/126 R |
| 3,704,183 | 11/1972 | Weigel | 148/36 |
| 4,023,988 | 5/1977 | Stickels et al. | 148/36 |

FOREIGN PATENT DOCUMENTS

| | | | |
|---|---|---|---|
| 40226 | 3/1979 | Japan | 148/36 |
| 43929 | 3/1982 | Japan | 148/36 |
| 41322 | 3/1982 | Japan | 148/12 R |
| 39126 | 3/1982 | Japan | 148/12 R |

Primary Examiner—Wayland Stallard
Attorney, Agent, or Firm—Michael A. Ciomek; Eugene J. Kalil

[57] ABSTRACT

A bearing steel containing about 0.8% to about 1.2% carbon, about 0.5% to about 1.33% manganese, about 0.25% to about 0.7% silicon, about 0.14% to about 0.5% molybdenum, up to about 0.75% chromium and the balance essentially iron has improved hardenability and resistance to rolling contact fatigue than does the standard 52100 bearing steel.

8 Claims, 7 Drawing Figures

BEARING STEEL

The present invention is directed to a steel of special composition which, in the spheroidized and hardened condition, exhibits high resistance to rolling contact fatigue and hence is particularly suitable for service in ball and roller bearings and in bearing races therefor.

BACKGROUND OF THE INVENTION AND THE PRIOR ART

The steel A.I.S.I. 52100 which contains, nominally, 0.95% to 1.10% carbon, 0.25% to 0.45% manganese, 0.20% to 0.35% silicon, 1.3% to 1.6% chromium and the balance, except for impurities, iron has long been known and has become recognized as the standard material for the production of bearings such as ball and roller bearings and races therefor. While this steel has established a welldeserved reputation, it would be desirable to provide a bearing steel having hardenability and rolling contact fatigue resistance which are improved as compared in properties to those of 52100. Mention can also be made of U.S. Pat. No. 3,155,550 and No. 3,194,698 which disclose chromium-free steel compositions said to be suitable in bearing service. U.S. Pat. No. 3,799,766 discloses a lowchromium steel for bearing service. The silicon content of the steels disclosed is too low to provide synergistic hardenability in combination with the molybdenum content given and nickel is relied upon to increase hardenability.

BRIEF DESCRIPTION OF THE INVENTION

The steel provided in accordance with the invention contains about 0.8% to about 1.2% carbon, about 0.5% to about 1.33% manganese, about 0.25% to about 0.7% silicon, about 0.14% to about 0.5% molybdenum, up to about 0.75% chromium, up to about 0.01% aluminum, up to about 0.03% nitrogen, no more than about 0.02% each of the impurities phosphorus and sulfur and the balance essentially iron. Preferably, the carbon content is about 0.95% to about 1.15%, the manganese content is about 0.55% to about 1.00%, the silicon content is about 0.45% to about 0.70%, the molybdenum content is about 0.25% to about 0.35% and chromium is employed in amounts of about 0.2% or about 0.25% up to about 0.35%.

The wrought steel after a normalizing heat treatment will have a pearlitic structure which is spheroidized by step-wise heat treatment in which the first step is accomplished at a temperature slightly below $Ac_1$ for the steel, e.g., within 50° F. below $Ac_1$, the second step is conducted at an intercritical temperature above $Ac_1$, but below $A_{cm}$, e.g., about 15° F. above $Ac_1$, and the third step is again conducted below $A_{c1}$. Heat treatment time in each step can vary considerably depending on operating factors and the response of an individual steel composition. For example, four hours or more in each of the three steps, totaling 12 hours, is usually sufficient. Some slight graphitization, well below one volume percent of graphite, and only when the silicon content is on the high side of the range, yet believed harmless to performance of the steel in bearing service, may be encountered in spheroidization treatments exceeding 12 hours, e.g., up to 24 hours. For large batches of steel requiring treatments exceeding 12 hours, e.g., up to 24 hours, it is preferred to limit silicon to about 0.5% or 0.55% and to employ a small amount of chromium, e.g., about 0.2% to about 0.5%. This prevents graphitization for treatments lasting up to 48 hours. Temperatures exceeding $A_{cm}$ are avoided during spheroidization.

DETAILED DESCRIPTION OF THE INVENTION

Figure 1:
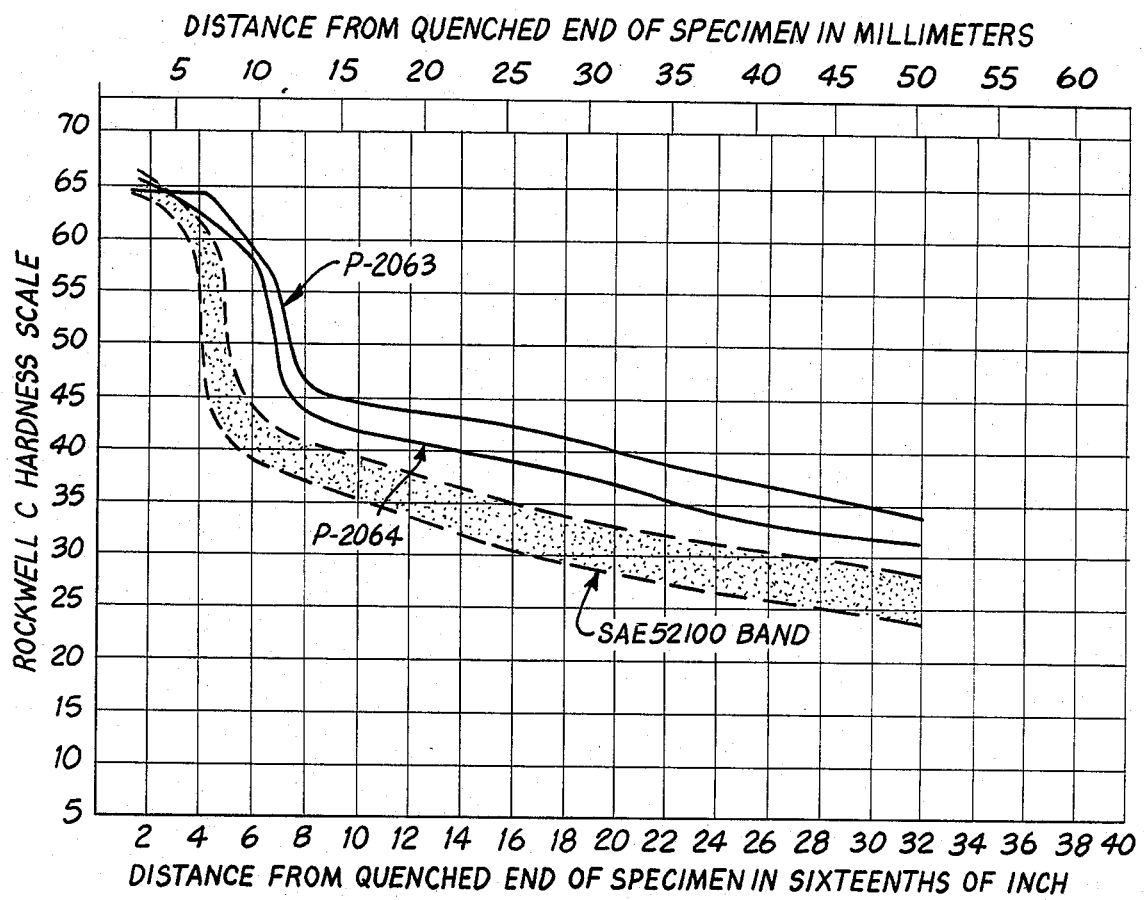
FIG. 1 depicts the Jominy hardenability curves for two steels in accordance with the invention compared to the hardenability experience range for 52100 steel.

A number of steels in accordance with the invention were prepared, processed and heat treated with the results set forth in the following Examples.

EXAMPLE 1

A laboratory steel melt was prepared containing 1.05 wt. % C, 0.54 wt. % Mn, 0.70 wt. % Si, 0.016 wt. % P, 0.022 wt. % S, and 0.30 wt. % Mo, with the balance Fe. This steel was cast into an ingot and forged into 36 mm. diameter bar stock, portions of which were subjected to a spheroidizing cycle of three four-hour stages. In the first stage, the steel was heated to 1297° F., below $Ac_1$, during which the pearlite phase was allowed to coarsen. The steel was then heated to 1337° F. in the second stage, which was above $Ac_1$ but below $A_{cm}$. Lamellar carbides were broken up and spheroidized in this stage; fine carbides were dissolved while larger carbides remained partially undissolved. The steel was then cooled to 1247° F. (again below $Ac_1$) for a third four-hour stage, during which iron carbides coarsened. The steel was then cooled in the furnace. This steel was then subjected to a hardening treatment, consisting of austenitizing for 15 minutes at 1535° F., quenching into oil at 145° F., and tempering for one hour at 350° F. The microstructure of the resulting product comprising spheroidized carbides in a matrix of tempered martensite. Following the quenching and tempering, the steel developed a hardness of 63 HRC, which is well within the expected range of 60–65 HRC for SAE 52100 steels. The steel in this Example contained 15% retained austenite, which compares favorably to an average of 12% retained austenite in conventional SAE 52100 steel.

Four heats of the Si—Mo bearing steel were prepared having the compositions set forth in Table 1.

TABLE 1

| Heat No. | Composition, % | | | | | | |
|---|---|---|---|---|---|---|---|
| | C | Mn | Si | P | S | Mo | Fe* |
| 1 | 0.96 | 0.56 | 0.49 | 0.013 | 0.015 | 0.23 | Bal. |
| 2 (P-2063) | 0.98 | 0.56 | 0.54 | 0.016 | 0.019 | 0.26 | Bal. |
| 4 | 1.10 | 0.66 | 0.64 | 0.014 | 0.016 | 0.31 | Bal. |
| 5 (P-2064) | 1.12 | 0.66 | 0.70 | 0.016 | 0.015 | 0.33 | Bal. |

*With trace elements.

The 65 pound heats were cast, forged, spheroidize annealed, hardened and tempered to proper hardness of about 62 Hardness Rockwell C (HRC) as described in this invention, except in two cases (Heats #2 and #5) the spheriodize annealing time of 30 hours exceeded the maximum recommended range of 24 hours by six hours. The other two heats (Heats #1 and #4) were spheroidize annealed for 12 hours.

The heats were used for the preparation of a series of cylindrical specimens to be tested in the Ball-Rod Rolling Contact Fatigue Tester and in the Rod-Disk Rolling Contact Fatigue Tester. These tests are described in "Rolling Contact Fatigue Testing of Bearing Steels" J. J. C. Hoo, Editor, *ASTM Special Technical Publication* 771, 1984, pp. 85–106 and ibid., pp. 107–124, respectively. These two tests are used exclusively in testing for the rolling contact fatigue resistance of bearing steels. Principally, in the first test a cylindrical pin (⅜ in. dia.) is held under 786 Ksi Hertzian stress inside of a bearing race containing three equally spaced balls (½ in. dia.) while the specimen rotates at a circular speed of 3600 rpm. In the second test, the same type of cylindrical pin (⅜ in. dia.) is confined under 700 Ksi Hertzian stress between two opposite rollers (7½ in. dia. disks, ½ in. thick having the outside edge rounded to ¼ in. radius). The test specimen is rotated at a circular speed of 12500 rpm. In either case, the test is stopped when spalling of the surface of the test specimen occurs. The results are reported in terms of "life" (i.e., millions of revolutions accumulated before failure) at which the probability of failure is 10% (L/10) and 50% (L/50). The results of the fatigue tests are given in Table 2.

TABLE 2
Comparison of Fatigue Life of Si-Mo Steel with Fatigue Life of AISI 52100 Bearing Steel

| Heat | Life at 10% Probability (Mil. Cycl.) | Improvement Over 52100 % | Life at 50% Probability (Mil. Cycl.) | Improvement Over 52100 % |
|---|---|---|---|---|
| #1 | 10.7 | 248 | 17.3 | 97 |
| #2* | 5.7 | 186 | 22.1 | 152 |
| #4 | 7.6 | 148 | 19.4 | 121 |
| #5* | 6.2 | 101 | 20.4 | 133 |
| AISI 52100 | 3.07** | — | 8.77** | — |

*Rod-Disk Test, all other heats Ball-Rod Test.
**Logarithmic mean of 9 heats.

The above results represent a substantial improvement in the rolling contact fatigue resistance for the steel of the invention as compared to AISI 52100 steel.

EXAMPLE 2

Material from Heats No. 2 and 5, the compositions of which are given in Table 1 which had been cast in 5¼ inch diameter by 8⅜ inch long steel tube molds standing on copper blocks was hot forged between 2050° and 1800° F. into 1¼ in. dia. bar stock and normalized at 1650° F. End-quench hardenability test specimens were prepared from this stock for each steel. The specimens were austenitized at 1550° F. for 30 minutes before end-quenching with water. Two parallel flats were ground on each bar 180 degrees apart, and Rockwell C hardness "HRC" was determined as a function of the distance from the quenched end.

The results are plotted in FIG. 1 where they are compared to the results on 15 heats of AISI 52100 bearing steel. The results, represented by characteristic Jominy curves, show that the curves of the Si—Mo steels are displaced substantially to the right, i.e., toward higher hardness at greater depth below the quenched end of the hardenability bars, with respect to the data band for the AISI 52100 bearing steel. Such displacement is evidence of the Si—Mo steels of the invention having a substantially higher hardenability than the AISI 52100 bearing steel.

EXAMPLE 3

Four 22.5 kg (50 lb) heats of Si—Cr—Mo steel were argon-induction melted. The initial charge for each heat consisted of Plastiron, ferrosilicon, ferrophosphorus, ferrosulfur, chromium and molybdenum. Appropriate amounts of aluminum, Acheson graphite and manganese were added after meltdown. The molten steel was poured into 90 mm (3.5 in.) diameter by 180 mm (7.0 in.) long steel pipe molds standing on copper chill blocks.

Chemical Composition

The steels were analyzed for carbon, manganese, silicon, phosphorus, sulfur, chromium, molybdenum, aluminum and nitrogen using standard methods of chemical analysis. The results of the analyses are listed in Table 3.

TABLE 3

| Heat No. | Composition, % | | | | | | | | N (ppm) |
|---|---|---|---|---|---|---|---|---|---|
|  | C | Mn | Si | P | S | Cr | Mo | Al |  |
| 6 (P-2453) | 1.01 | 1.00 | 0.42 | 0.018 | 0.015 | 0.25 | 0.27 | 0.009 | 5 |
| 7 (P-2454) | 1.14 | 1.33 | 0.53 | 0.018 | 0.014 | 0.25 | 0.34 | 0.009 | 8 |
| 8 (P-2455) | 1.13 | 1.11 | 0.49 | 0.018 | 0.014 | 0.49 | 0.33 | 0.007 | 10 |
| 9 (P-2456) | 1.14 | 1.13 | 0.52 | 0.018 | 0.015 | 0.75 | 0.34 | 0.008 | 8 |

End-Quench Hardenability

A portion of each ingot was hot forged between 1150° C. (2100° F.) and 1040° C. (1900° F.) into 36 mm (1⅜ in.) diameter bar stock and normalized at 900° C. (1650° F.). The end-quench hardenability test specimens were machined from the normalized stock, austenitized at 845° C. (1550° F.) for 30 minutes and end-quenched. Two parallel flats were ground on each bar 180 degrees apart, and Rockwell C hardness was determined as a function of the distance from the quenched end. The procedure of the test conformed with ASTM Standard A255-67.

The normalized 36 mm (1⅜ in.) diameter bar stock was utilized for the preparation of dilatometric specimens. The specimens measured 3.00 mm (0.118 in.) in diameter by 10.0 mm (0.394 in.) long. A 2.00 mm (0.079 in.) diameter hole was drilled axially into one end to accommodate a platinum-rhodium thermocouple which was percussion welded to the bottom of the hole.

The critical temperatures $Ac_1$ and $A_{cm}$ were determined on a Formastor-F dilatometer in which specimens are induction heated and either radiation cooled or forced-convection cooled by helium at various rates. During the heating and cooling cycles, changes in the specimen length and in temperature versus time were simultaneously recorded.

The critical temperatures, $Ac_1$, at which austenite begins to form on heating, and $A_{cm}$, at which the steel becomes fully austenitic, were determined by heating the specimens rapidly to 600° C. (1112° F.), and then heating at a constant rate of 2° C./min (3.6° F./min) to 960° C. (1760° F.), and are set forth in Table 4.

TABLE 4

| Heat | Critical Temperatures, °C. (°F.) | |
|---|---|---|
| | $A_{c1}$ | $A_{cm}$ |
| 6 (P-2453) | 698 (1288) | 725 (1337) |
| 7 (P-2454) | 690 (1274) | 715 (1319) |
| 8 (P-2455) | 720 (1328) | 735 (1355) |
| 9 (P-2456) | 720 (1328) | 735 (1355) |

The forged 36 mm (1⅜ in.) diameter bar stock was spheroidize-annealed in three stages. In the first stage (16 hours long), the steels were held at a subcritical temperature, allowing the pearlite to partially spheroidize. In the second stage (8 hours long), the temperature was increased to an intercritical temperature causing further spheroidization of the lamellar carbides. During this stage carbides that were very fine dissolved completely while larger carbides dissolved partially to act as "seed" carbides in the next stage. In the third stage (16 hours long), the temperature was lowered again to the same subcritical temperature as the first stage where the carbon in solution precipitated principally on the existing carbides, making them coarse. The cycle ended by air cooling the steels to room temperature.

The hardening treatment of the spheriodize-annealed steels consisted of austenitizing for 30 minutes at 835° C. (1535° F.), quenching into oil at 63° C. (145° F.) and tempering for one hour at 175° C. (350° F.).

The percent retained austenite of the hardened steels was determined using a standard procedure based on comparison of integrated intensity of the α200 diffraction line with that of the γ220 line. The source of X-rays was the K-radiation of a molybdenum target. The percent retained austenite for heats 6 (P2453), 7 (P2454), 8 (P2455) and 9 (P2456) were, respectively, 30.2%, 30.8%, 22.3%, and 21.6%.

Hardness profiles (HRC) were determined on oil quenched and tempered steel bars 36 mm (1⅜ in.) in diameter.

The microstructures of the spheroidize-annealed steels were examined in the light microscope and photomicrographs of selected microstructures taken at 1000 diameters are shown in FIGS. 4A to D.

Figure 2:
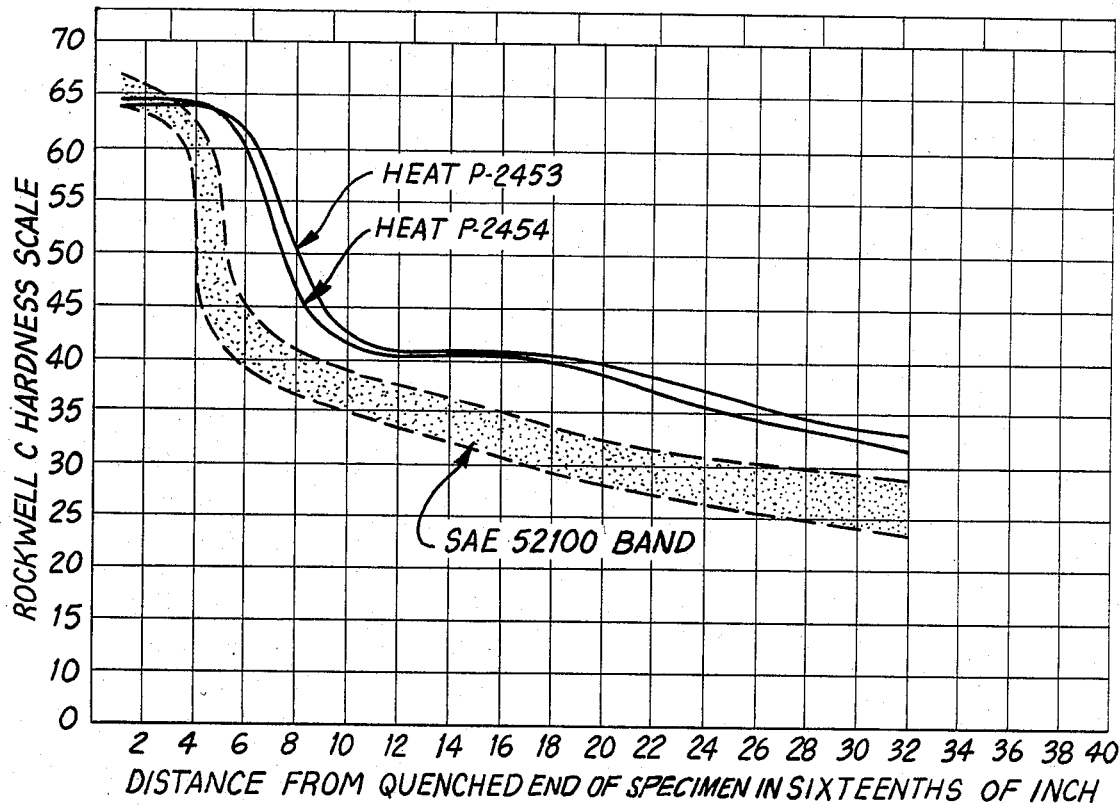
FIG. 2 depicts the Jominy hardenability curves for two further steels of the invention compared to the hardenability experience range for 52100 steel.
Figure 3:
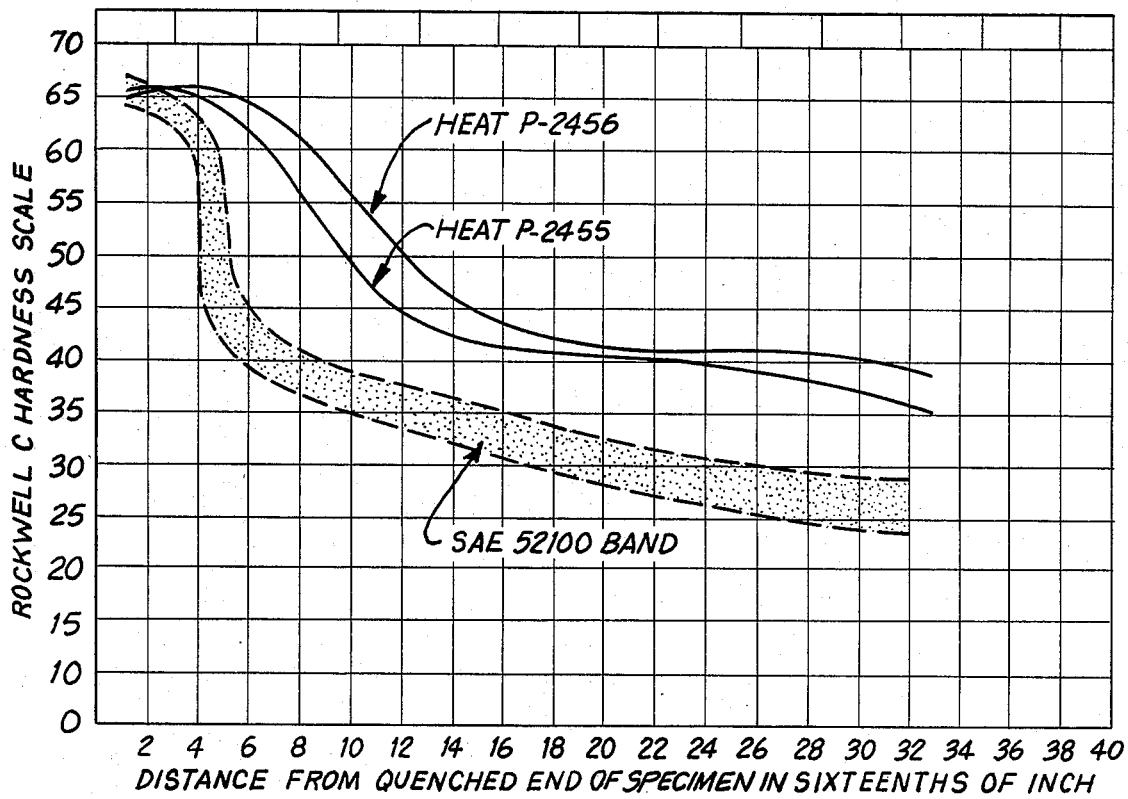
FIG. 3 depicts the Jominy hardenability curves for two additional steels of the invention compared to the hardenability experience range for 52100 steel.
Figure 4A:
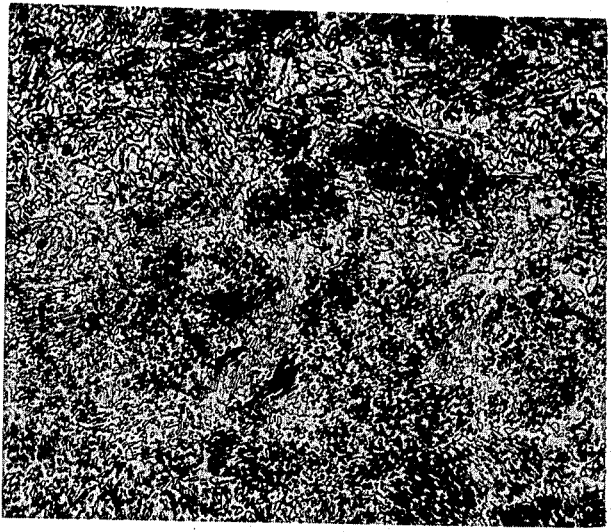
FIGS. 4A, 4B, 4C and 4D are representations of photomicrographs taken at 1000 diameters depicting the spheroidized microstructures of four steels of the invention.
Figure 4B:
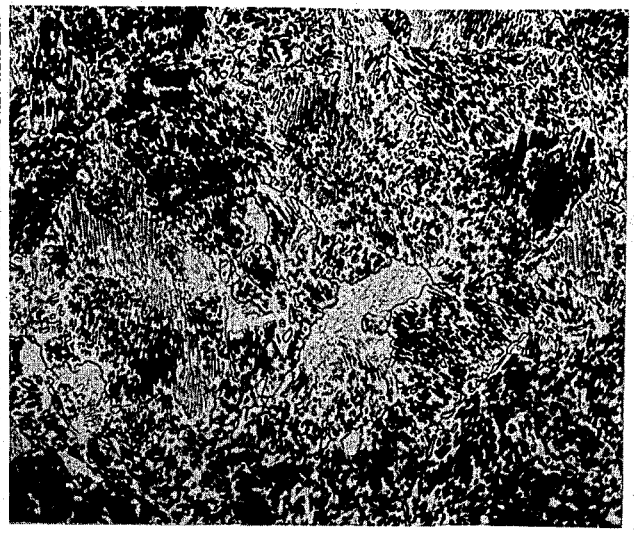
Figure 4C:
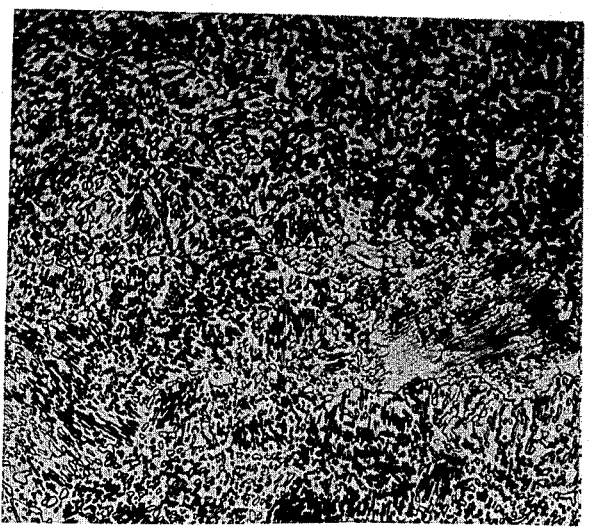
Figure 4D:
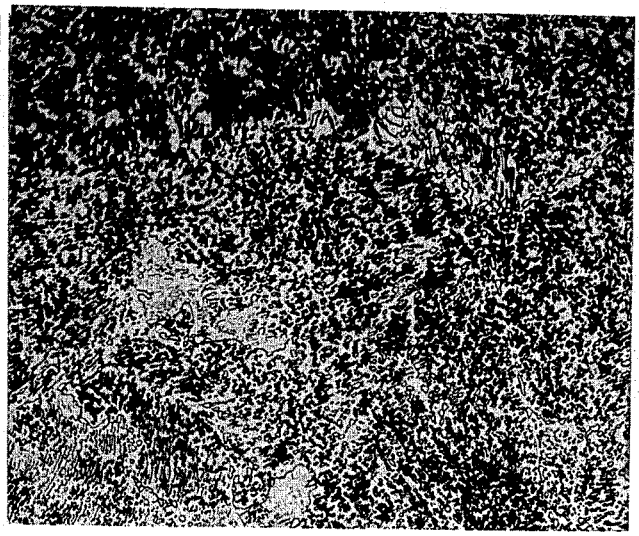

The Jominy hardenability curves of the four steels tested are plotted in FIGS. 2 and 3 where they are compared to an experience band of SAE 52100 based on 15 heats of the steel. In all cases, the steels are displaced to the right of the band indicating superior hardenability over that of the standard SAE 52100. They thus more than satisfy the customary minimum hardenability requirement for bearing steels which is a hardness of 55 HRC at the J₅ distance (i.e., five sixteenths of an inch from the quenched end of the Jominy bar).

The subcritical temperatures for the spheroidize-annealing cycle, i.e., 670° C. (1238° F.) and 700° C. (1292° F.) (see FIG. 1) were selected to be about 20° to 28° C. (36° to 50° F.) degrees below the $A_{c1}$ temperature. The intercritical hold was done at a temperature 5° to 15° C. (9° to 27° F.) below the $A_{cm}$ temperature. The total length of the full 40-hour cycle far exceeds the length of the usual commercial spheroidize-anneal cycle of 24 hours.

Metallography

The microstructures of the spheroidize-annealed specimens of Heats 6 (P-2453), 7 (P-2454), 8 (P-2455) and 9 (P-2456) are presented in FIGS. 4A to D, respectively are characterized by fine spheroidized carbides in the matrix of ferrite.

The hardness profiles determined upon the hardened 36 mm bars demonstrated that the desired surface hardness of 61-63 HRC, thereby showing the desired hardness result was obtained. No evidence of graphitization was observed even after the excessively long 40-hour spheroidize-anneal cycle showing that chromium in the small amount of about 0.25% coupled with a silicon content in the 0.4-0.5% range prevented graphitization.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A wrought steel in the spheroidized and hardened condition having high hardness and resistance to rolling contact fatigue consisting essentially, by weight, of about 0.8% to about 1.2% carbon, about 0.5% to about 1.33% manganese, about 0.25% to about 0.7% silicon, about 0.25% to about 0.5% molybdenum, up to about 0.75% chromium, up to about 0.01% aluminum, up to about 0.03% nitrogen, with the balance essentially iron, said steel demonstrating superior hardenability to that of standard SAE 52100 and showing substantially no evidence of graphitization after a long spheroidize-annealing cycle.

2. A steel in accordance with claim 1 containing at least about 0.25% chromium and not more than about 0.5% silicon.

3. A steel in accordance with claim 1 consisting essentially of about 0.95% to about 1.15% carbon, about 0.55% to about 1% manganese, about 0.45% to about 0.7% silicon, about 0.25% to about 0.35% molybdenum, about 0.2% to about 0.35% chromium and the balance essentially iron.

4. A rolling contact bearing made of a wrought spheroidized and hardened steel having the composition set forth in claim 1.

5. The process for producing a wrought steel having high hardenability and, in the hardened condition, having high resistance to rolling contact fatigue which comprises hot working an ingot made of a steel composition consisting essentially of, by weight, about 0.8% to about 1.2% carbon, about 0.5% to about 1.33% manganese, about 0.25% to about 0.7% silicon, about 0.25% to about 0.5% molybdenum, up to about 0.75% chromium, up to about 0.01% aluminum, up to about 0.03 nitrogen, with the balance essentially iron, normalizing a resultant hot-worked form, spheroidizing the normalized form by sequentially heating in a first step at a temperature not more than 50° F. below the $A_{c1}$ temperature for the steel for a time sufficient to partially spheroidize perlite, then heating in a second step at a temperature intermediate $A_{c1}$ and $A_{cm}$ to produce further spheroidization of lamellar carbides, dissolution of fine carbides and partial solution of larger carbides and then a heating in a third step at essentially the same subcritical temperature as that employed in said first step to cause precipitation upon and coarsening of existing carbides in the microstructure of said steel, with substantially no evidence of graphitization after a long spheroidize-annealing cycle.

6. The process in accordance with claim 5 wherein the temperature in each of said first and third steps is between about 1220° and 1320° F., the temperature of said second step is at least about 15° F., above $A_{c1}$ for said steel and is between about 1255° F. and 1350° F.

7. The process in accordance with claim 5 wherein said steel contains at least about 0.25% chromium and not more than about 0.5% silicon.

8. The process in accordance with claim 5 wherein said steel contains about 0.95% to about 1.15% carbon, about 0.55% to about 1% manganese, about 0.45% to about 0.7% silicon, about 0.25% to about 0.35% molybdenum and about 0.2% to about 0.35% chromium.

* * * * *